United States Patent [19]
Neff

[11] Patent Number: 5,637,211
[45] Date of Patent: Jun. 10, 1997

[54] PIPE DRAIN DIFFUSION BAG SYSTEM AND KIT

[76] Inventor: Gregory S. Neff, 9730 S. Candlewood Dr., Sandy, Utah 84092

[21] Appl. No.: 582,145

[22] Filed: Jan. 2, 1996

[51] Int. Cl.$^6$ ............................................. B01D 35/02
[52] U.S. Cl. ........................... 210/170; 210/266; 210/501; 405/128
[58] Field of Search ............................ 210/170, 460, 210/449, 266, 282, 501, 162, 165; 405/128, 129

[56] References Cited

U.S. PATENT DOCUMENTS

| | | | |
|---|---|---|---|
| 307,822 | 11/1884 | Weightman | 210/460 |
| 621,937 | 3/1899 | Niemann | 210/460 |
| 3,441,140 | 4/1969 | Thurber | 210/170 |
| 3,722,686 | 3/1973 | Arnett et al. | 210/170 |
| 3,762,562 | 10/1973 | Okuniewski et al. | 210/460 |
| 3,917,530 | 11/1975 | Boske | 210/170 |
| 3,936,380 | 2/1976 | Boske | 405/45 |
| 4,031,009 | 6/1977 | Hicks | 210/170 |
| 4,419,232 | 12/1983 | Arntyr et al. | 210/170 |
| 4,983,068 | 1/1991 | Kozak et al. | 405/36 |
| 4,986,699 | 1/1991 | Bohnhoff | 210/170 |
| 5,000,618 | 3/1991 | Greenley | 405/129 |
| 5,011,602 | 4/1991 | Totani et al. | 210/501 |
| 5,015,123 | 5/1991 | Houck et al. | 405/45 |
| 5,026,359 | 6/1991 | Burroughs | 210/501 |
| 5,089,108 | 2/1992 | Small | 210/460 |
| 5,178,752 | 1/1993 | McKinnon | 210/416.1 |
| 5,511,904 | 4/1996 | Van Egmond | 210/165 |

*Primary Examiner*—Cynthia L. Nessler
*Attorney, Agent, or Firm*—Marcus G. Theodore

[57] ABSTRACT

A liquid diffuser drain bag for pipe drains comprising a liquid permeable woven nylon bag with an opening sized and structured to fit over and around an underground pipe drain; said bag sized to hold a plurality of loosely packed light weight rigid particles, and ties to secure the bag opening around the pipe drain.

1 Claim, 1 Drawing Sheet

PIPE DRAIN DIFFUSION BAG SYSTEM AND KIT

BACKGROUND OF THE INVENTION

1. Field

This invention pertains to pipe drain installations. More particularly, it provides a liquid diffusion bag surrounding a pipe drain to aid in dispersement of liquids drained from pipes.

2. Statement of the Art

Underground pipes carrying water and land appliable liquids are typically installed with manual or automatic drains to drain fluids into the ground when the liquid pipe transport is completed and the line pressure is released. This drain feature is especially important in colder climates where the stored liquids will freeze and burst the pipes if not drained. These pipe drains are installed beneath or above the ground and typically are surrounded by a loose gravel or pebble sump to aid in collecting and diffusing the drained liquids into the ground. Where a pipe system, such as a sprinkler system, has a number of underground pipe drains for each line, large amounts of gravel are required to fill the gravel drain sumps. This gravel is heavy to carry and install, and has a tendency over time to build up with fine clays and soils; thereby slowing the liquid drainage dispersement into the soil. Gravel and rock storage systems are also subject to root infiltration, which can fill up the interstices between the gravel particles to slow liquid drainage. If it is later necessary to repair the pipe drains after installation, these gravel drain sumps generally cannot be re-used because the digging to access the damaged drain fills up the gravel sump. Then the gravel has to be entirely replaced.

In addition, the gravel can act as a haven for insects, and bacteria, which can cause odors and spread of disease.

There thus remains a need for a light weight underground pipe drain dispersion system which maintains its water collection and ground dispersion ability over time. The invention described below provides such a device.

SUMMARY OF THE INVENTION

The invention comprises a liquid collector and diffuser drain bag for buried underground pipe drains. It comprises a hollow interior liquid permeable bag with walls defining an opening sized and structured to fit over and around a pipe drain. The opening is in communication with the interior of the bag which is sized and structured to hold a plurality of loosely packed particles filling the interior of the bag. The size of the bag is dependent upon the size of the pipe system to be drained. For smaller home sprinkler systems, the bag is approximately 10 inches high, 10 inches deep, and 10 inches in length. For larger commercial drain systems, the bag may be up to approximately 36 inches high, 36 inches deep, and 36 inches in length.

The particles are water and liquid impervious, and have sufficient density and separate integrity to maintain their interstice packing, when buried. Preferably the particles are made of a lightweight materials such as polystyrene, nylon, recycled plastic materials etc. which are easy to carry as well as water resistant, and resistant to crushing and settlement to maintain porosity. To prevent ground odor build-up, time released fungicide and germicide additives may be intermixed with the particles within the bag.

Securing means, such as string ties are associated with the bag opening to secure the bag around the pipe drain after its opening is placed over the drain. In one preferred embodiment, the bag is constructed of a filter woven nylon material with strands which allow the liquid to drain through the weave, while at the same time preventing silt build-up around the drain. This tough long lasting material provides even water disbursement and is impervious to tree roots and can be re-used if the drain is unburied for repair. This bag may also be treated with chemical repellents to insure that tree roots do not enter the bag and into the drain.

This underground pipe drain dispersion bag is preferably used and sold as a kit designed to provide all of the components necessary to complete the drain installation. The kit comprises the nylon woven filter bag with water resistant draw string ties proximate to the opening, and a supply of polystyrofoam balls or particles sufficient to fill the bag when secured around the drain. The kit can be used with any type of pipe drain. The bag is first filled with the particles, inserted over the drain, and the ties drawn and secured to close the bag opening over and about the drain opening. In other drains, the ties are drawn and secured over and about the drain, and the ends of the ties passed about the pipe and tied to insure that the bag will not come off over time. It is also possible to use the diffusion bag with the ends of rain gutter drain pipes to diffuse water running off roofs. These applications are generally only used during mild weather to prevent the drain water from digging up lawns, flower gardens, etc. The drain bag is therefore removed in the winter to prevent the bag from freezing and obstructing the drain pipe.

This pipe drain dispersion bag thus provides a light weight labor saving drain collection and dispersion system which maintains its water collection and ground dispersion abilities over time. The filter fabric pouch or bag also acts to filter the drained water; thereby providing less chance of ground water contamination, while at the same time acting as a root barrier.

It also is light weight and easily carried and installed on a variety of underground drain systems. For example, to install a single underground drain sump, a user typically purchases a bag of gravel which is bulky to carry. The sump is then dug around the drain, filled with gravel, and buried. This usually leaves excess gravel which then has to be disposed of. Conversely, with the present invention, the lightweight particle filled bag is tied around the drain and then buried. There is no need to carry and dispose of excess gravel. In larger installations, even more savings are made by avoiding the necessary of delivering and moving large amounts of gravel to the job site for installation. In short, the cost of installation of the drain bag is less than installing aggregate fill drains.

DESCRIPTION OF THE ILLUSTRATED EMBODIMENTS

Figure 1:
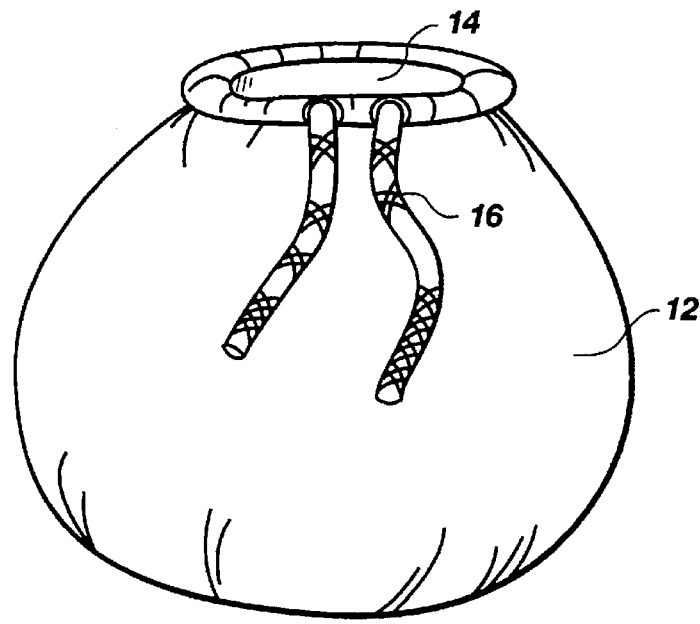
FIG. 1 illustrates one preferred kit embodiment of the invention.
Figure 2:
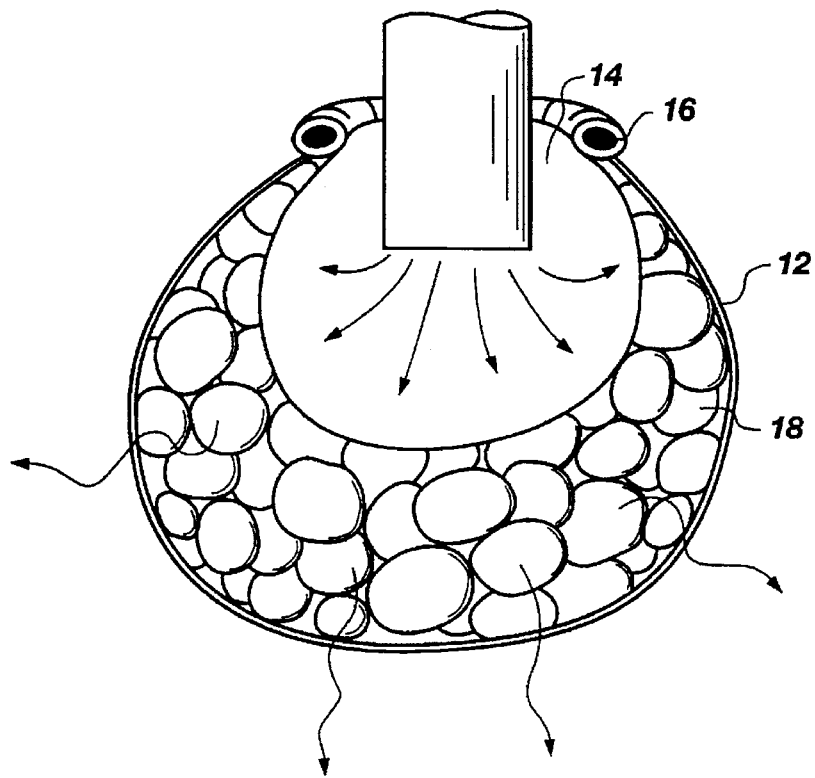
FIG. 2 illustrates the preferred embodiment of the invention secured around a drain valve.

FIG. 1 illustrates a preferred kit embodiment of the invention 10. The kit includes a nylon woven bag 12 approximately 10 inches in length, 10 inches in width, and 10 inches in depth. The bag 12 has an draw string top opening 14 secured with a drawstring ties 16 made of nylon. A sufficient supply of round polystyrene balls 18 shown in FIG. 2 is included for placement within the opening 14 of the bag 12. If desired, the bag 12 can also be filled with time release balls of fungicides or insecticides, not shown, are included in this preferred kit 10.

To secure the invention 10 about the drain valve, the bag 12 is first filled with polystyrene balls 18. Next, the opening 14 of the bag 12 is positioned over the drain valve. The drawstring ties 16 are then pulled and to secure the opening 14 of the bag about the drain valve and the ends tied around the pipe. The secured filled bag 12 is then buried under the ground. Thus positioned, the drain valve drains into the bag 12 which then filters and diffuses liquid into the ground. The bag 12 prevents the drain valve from plugging with earth, and also insures that the interstices between the polystyrene balls 18 are not similarly plugged to slow water dispersion of the drained lines.

This inexpensive lightweight kit 10 is easy to install and avoids the necessity of using gravel to fill and line a sump pit surrounding a pipe drain.

Although this specification has made reference to the illustrated embodiments, it is not intended to restrict the scope of the appended claims. The claims themselves recites those features deemed essential to the invention.

I claim:

1. In an underground drainage system comprising at least one drain pipe having an open end disposed beneath the ground, the improvement comprising:

a liquid-permeable bag disposed beneath the ground, said bag having an opening, securing means disposed about said bag opening for securing said bag opening around said open end, said securing means preventing soil, tree roots, rocks, and debris from clogging the drain pipe and allowing liquids from the drain pipe to diffuse through said bag into the ground;

said bag containing a plurality of loosely-packed, lightweight, rigid, water-insoluble particles;

said bag further containing time-released fungicide and germicide intermixed with said particles within said bag.

\* \* \* \* \*